(12) United States Patent
Johnson et al.

(10) Patent No.: US 12,012,513 B2
(45) Date of Patent: Jun. 18, 2024

(54) BLENDS OF POLYESTERS AND POLYSACCHARIDES

(71) Applicant: DuPont Industrial Biosciences USA, LLC, Wilmington, DE (US)

(72) Inventors: Ross S. Johnson, Wilmington, DE (US); Vindhya Mishra, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 795 days.

(21) Appl. No.: 16/971,444

(22) PCT Filed: Feb. 7, 2019

(86) PCT No.: PCT/US2019/016979
§ 371 (c)(1),
(2) Date: Aug. 20, 2020

(87) PCT Pub. No.: WO2019/164669
PCT Pub. Date: Aug. 29, 2019

(65) Prior Publication Data
US 2020/0399464 A1    Dec. 24, 2020

Related U.S. Application Data

(60) Provisional application No. 62/634,969, filed on Feb. 26, 2018.

(51) Int. Cl.
*C08L 67/03* (2006.01)
*C08L 5/00* (2006.01)

(52) U.S. Cl.
CPC ............... *C08L 67/03* (2013.01); *C08L 5/00* (2013.01); *C08L 2205/03* (2013.01)

(58) Field of Classification Search
CPC .................................. C08L 67/03; C08L 5/00
See application file for complete search history.

(56) References Cited

U.S. PATENT DOCUMENTS

| | | | |
|---|---|---|---|
| 7,000,000 B1 | 2/2006 | O'Brien | |
| 8,344,134 B2 * | 1/2013 | Shelby | C08B 3/08 536/64 |
| 9,403,917 B2 | 8/2016 | Kasat et al. | |
| 2008/0090984 A1 * | 4/2008 | Namikoshi | C08G 63/06 536/124 |
| 2010/0228019 A1 * | 9/2010 | Umemoto | C08B 3/16 536/63 |
| 2014/0323715 A1 * | 10/2014 | Kasat | C08L 5/00 264/299 |
| 2015/0191550 A1 * | 7/2015 | Mishra | C08L 5/00 264/299 |
| 2016/0304629 A1 * | 10/2016 | Kasat | C08L 5/00 |
| 2017/0204232 A1 * | 7/2017 | Mishra | C08B 37/0009 |
| 2017/0362345 A1 * | 12/2017 | Behabtu | C08J 5/18 |
| 2019/0225737 A1 | 7/2019 | Behabtu et al. | |
| 2019/0345267 A1 * | 11/2019 | Adelman | C08B 37/0021 |
| 2019/0345642 A1 | 11/2019 | Adelman et al. | |
| 2020/0062931 A1 | 2/2020 | Behabtu et al. | |
| 2020/0181370 A1 | 6/2020 | Behabtu et al. | |
| 2020/0263026 A1 | 8/2020 | Lenges et al. | |
| 2020/0308371 A1 * | 10/2020 | Briegel | C08L 5/00 |
| 2020/0347152 A1 | 11/2020 | Paullin et al. | |
| 2021/0395496 A1 * | 12/2021 | Matsumoto | C08L 5/00 |
| 2022/0275112 A1 * | 9/2022 | Cheng | A21D 13/45 |

FOREIGN PATENT DOCUMENTS

| | | | |
|---|---|---|---|
| WO | 2014105698 A1 | 7/2014 | |
| WO | 2016106068 A1 | 6/2016 | |

OTHER PUBLICATIONS

International Search Report for PCT/US2019/016979 dated May 27, 2019.

* cited by examiner

Primary Examiner — Liam J Heincer

(57) ABSTRACT

A polyester composition comprising at least one polyester selected from the group consisting of poly(trimethylene terephthalate), polyethylene terephthalate, polybutylene terephthalate, and copolymers thereof; and at least one poly alpha-1,3-glucan ester having a degree of substitution of from about 0.3 to 3 moles of at least one acyl group per repeat unit of poly alpha-1,3-glucan. Articles prepared from these polyester compositions exhibit at least one improved physical property such as heat deflection temperature, tensile strength, Young's modulus, or impact strength. Such polyester compositions may also be prepared from renewable resources.

20 Claims, No Drawings

BLENDS OF POLYESTERS AND POLYSACCHARIDES

This application is the National Stage application of International Application No. PCT/US2019/016979 (filed Feb. 7, 2019), which claims the benefit of U.S. Provisional Application No. 62/634,969 (filed Feb. 26, 2018), both of which prior applications are incorporated herein by reference in their entirety.

OVERVIEW

Disclosed herein are novel polyester compositions comprising at least one poly alpha-1,3-glucan ester. Also disclosed herein are articles prepared from said polyester compositions and processes for preparing the polyester compositions.

In order to target a variety of application spaces, polyesters such as polytrimethylene terephthalate (PTT) and polybutylene terephthalate (PBT) typically require additives to improve certain property deficiencies. For example, PTT has a glass transition temperature of about 50° C. which typically prevents PTT from being used in applications that endure elevated temperature exposure.

There is a desire to increase the renewable content of polymers to meet the sustainability goals of manufacturers. DuPont™ Sorona® EP polytrimethylene terephthalate polymer grades are made with renewably sourced propanediol.

WO 2016/106068 discloses blends of poly alpha-1,3-glucan with various polymers including polyamides, polyethylene, polyvinyl alcohol, polyesters, and other polymers.

U.S. Pat. No. 9,403,917 discloses the preparation of poly alpha-1,3-glucan esters and mixed esters and films from these esters.

It would be desirable to develop additives for polyester compositions, especially compositions comprising PTT, in which the additives are derived from renewable resources.

Abbreviations

The claims and description herein are to be interpreted using the abbreviations and definitions set forth below.

"%" refers to the term percent.
"wt. %" refers to weight percent.
"MPa" refers to megapascal
"mp" refers to melting point
"° C." refers to degrees centigrade Definitions As used herein, the article "a" refers to one as well as more than one and does not necessarily limit its referent noun to the grammatical category of singular number.

As used herein, the term "article" refers to an item, thing, structure, object, element, device, etc. that is in a form, shape, configuration that is suitable for a particular use or purpose without further processing of the entire entity or a portion of it.

As used herein, the term "repeat unit" refers to part of a polymer whose repetition would produce the complete polymer chain. For example, for polyamide 66 the repeat unit is an adipic acid monomer bonded to a hexamethylenediamine monomer such that the repeat unit is adipic acid-hexamethylenediamine bonded together by an amide linkage. The resulting polymer is hexamethylene adipamide.

As used herein, the term "polymer resin" refers to the neat polymer used in the polymer compositions and only comprises the polymer chain or repeat units produced from the respective monomers. In other words, no additional additives are present in the polymer.

As used herein, the term "polyester composition" refers to a polymer resin and additional materials used in the composition such as UV stabilizers, other polymers, lubricants, and fillers.

As used herein, the term "acyl group" refers to a functional group comprising a carbon atom double-bonded to an oxygen atom (C=O) wherein the carbonyl carbon atom is additionally attached to an alkyl or aryl group with a single bond and the carbonyl carbon atom further bonded to a hydroxyl group of poly alpha-1,3-glucan with a single bond. Acyl groups may be represented by the formula:

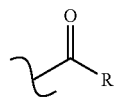

wherein R is an alkyl or aryl group. As used herein, the carbonyl carbon of the acyl group is bonded to a hydroxyl oxygen atom of poly alpha-1,3-glucan.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Generally

Disclosed herein are novel polyester compositions comprising at least one poly alpha-1,3-glucan ester. Polyester resins useful in preparing these polyester compositions include polytrimethylene terephthalate, polybutylene terephthalate, and polyethylene terephthalate. The concentration of polyester resin in these polyester compositions may range from about 10 to 95 weight percent and the poly alpha-1, 3-glucan ester(s) concentration may range from about 5 to 90 weight percent based on the total weight of polyester resin and poly alpha-1,3-glucan ester(s) in the polyester composition.

Specifically disclosed herein are novel polyester compositions comprising:
A) from about 10 to about 95 weight percent of at least one polyester selected from the group consisting of poly(trimethylene terephthalate), polyethylene terephthalate, polybutylene terephthalate, and copolymers thereof; and
B) from about 5 to about 90 weight percent of at least one poly alpha-1,3-glucan ester having a degree of substitution of from about 0.3 to 3 moles of at least one acyl group per repeat unit of poly alpha-1,3-glucan.

Depending on the polyester used, the concentration of the at least one poly alpha-1,3-glucan ester, and the degree and type of substitution on the poly alpha-1,3-glucan ester, these polyester compositions may exhibit enhanced tensile properties, impact performance, and thermal properties compared to identical polyester compositions which do not comprise a poly alpha-1,3-glucan ester as defined herein.

Also disclosed herein are polyester compositions comprising:
A) from about 10 to about 75 weight percent of at least one polyester selected from the group consisting of poly(trimethylene terephthalate), polyethylene terephthalate, polybutylene terephthalate, and copolymers thereof; and
B) from about 25 to about 90 weight percent of at least one poly alpha-1,3-glucan ester having a degree of substitution of from about 0.3 to 3 moles of at least two acyl groups per repeat unit of poly alpha-1,3-glucan; wherein said at least one poly alpha-1,3-glucan ester comprises from 0.05 to 0.2 moles of at least one acyl group selected from enanthyl, caprylyl, pelargonyl, capryl, undecanoyl, lauroyl, tridecanoyl, myristyl, pentadecanoyl, palmitoyl, heptadecanoyl, stearyl, nonadecanoyl, arachidyl, uneicosanoyl, behenyl, trieicosanoyl, lignoceryl, pentaleicosanoyl, cerotyl, and from 2.7 to 2.3 moles of acetyl groups, and wherein said polyester composition exhibits an impact strength when measured according to ASTM 256-10 which is at least 10 percent greater than polyester A.

Further disclosed herein are polyester compositions comprising:
A) from about 10 to about 85 weight percent of poly (trimethylene terephthalate); and
B) from about 15 to about 90 weight percent of at least one poly alpha-1,3-glucan ester having a degree of substitution of from about 2.30 to 2.9 moles of at least two acyl groups per repeat unit of poly alpha-1,3-glucan;
wherein said at least one poly alpha-1,3-glucan ester comprises from 0.05 to 0.2 moles of at least one acyl group selected from enanthyl, caprylyl, pelargonyl, capryl, undecanoyl, lauroyl, tridecanoyl, myristyl, pentadecanoyl, palmitoyl, heptadecanoyl, stearyl, nonadecanoyl, arachidyl, uneicosanoyl, behenyl, trieicosanoyl, lignoceryl, pentaleicosanoyl, cerotyl, and from greater than 2.3 to 2.7 moles of acetyl groups; and
wherein said polyester composition exhibits a heat deflection temperature when measured according to ASTM D648-16 method B which is at least equal to or greater than polyester A.

Additionally disclosed herein are polyester compositions comprising:
A) from about 10 to about 80 weight percent of at least one polyester selected from the group consisting of poly(trimethylene terephthalate), polyethylene terephthalate, polybutylene terephthalate, and copolymers thereof; and
B) from about 20 to about 90 weight percent of at least one poly alpha-1,3-glucan ester having a degree of substitution of from about 2.3 to 2.8 moles of acetyl groups.

Further disclosed herein are processes for preparing polyester compositions. Specifically, a process of making polyester compositions comprises the step of mixing:
a) about 10 to 95 wt. % of at least one polyester resin;
b) about 5 to about 90 wt. % of at least one poly alpha-1,3-glucan ester;
c) optionally, about 0.01 to 10 wt. % of at least one additive selected from the group consisting of nucleating agents, waxes, ultraviolet stabilizers, colorants, antioxidants, lubricants, impact modifiers, plasticizers, and mixtures of these; wherein the total concentration of ingredients is based on the weight of ingredients (a), (b), and (c), and wherein the total concentration of ingredients equals 100 weight percent.

Also disclosed herein are articles prepared from the polyester compositions.

Polyesters

Polyester resins useful in the polyester compositions disclosed herein include poly(trimethylene terephthalate) (PTT) homopolymers and copolymers, polyethylene terephthalate (PET) homopolymers and copolymers, polybutylene terephthalate (PBT) homopolymers and copolymers, poly (cyclohexanedimethanol) terephthalate (PCT) homopolymers and copolymers, and blends of these. These polyesters may also be blended with other polymers such as chlorinated polymers (e.g. polyvinyl chloride), acrylonitrile butadiene styrene (ABS), and acrylonitrile styrene acylate (ASA).

Examples of poly(trimethylene terephthalate) copolymers include copolyesters synthesized from 3 or more reactants, each having two ester forming groups. For example, a poly(trimethylene terephthalate) copolymer may be prepared by reacting 1,3-propanediol, terephthalic acid, and one or more comonomers selected from linear, cyclic, and branched aliphatic dicarboxylic acids having 4 to 12 carbon atoms such as butanedioic acid, pentanedioic acid, hexanedioic acid, azelaic acid, sebacic acid, dodecanedioic acid, 1,4-cyclohexanedicarboxylic acid, or ester-forming equivalents thereof; aromatic dicarboxylic acids other than terephthalic acid having 8 to 12 carbon atoms such as phthalic acid, isophthalic acid or 2,6-naphthalenedicarboxylic acid; linear, cyclic, and branched aliphatic diols other than 1,3-propanediol having 2 to 8 carbon atoms such as ethanediol, 1,2-propanediol, 1,4-butanediol, hexamethylene glycol, 3-methyl-1,5-pentanediol, 2,2-dimethyl-1,3-propanediol, 2-methyl-1,3-propanediol, cyclohexane dimethanol or 1,4-cyclohexanediol; and aliphatic and aromatic ether glycols having 4 to 10 carbon atoms such as hydroquinone bis(2-hydroxyethyl) ether. Alternatively, a poly(trimethylene terephthalate) copolymer may be prepared from a poly(ethylene ether) glycol having a molecular weight below about 460, such as diethylene ether glycol, methoxypolyalkylene glycol, diethylene glycol, and polyethylene glycol. The comonomer may be present in the copolymer at a level of about 0.5 to about 30 mol %, preferably at a level of up to about 20 mol %.

When PTT copolymers are used in the polyester compositions disclosed herein, they preferably comprise at least about 85 mol %, more preferably at least about 90 mol %, even more preferably at least about 95 mol %, and most preferably at least about 98 mol % of trimethylene terephthalate repeat units.

When a PTT homopolymer is used in the polyester compositions disclosed herein, a suitable PTT homopolymer is commercially available under the tradename Sorona® from E.I. du Pont de Nemours and Co., Wilmington, Delaware.

Polyester may also be blended with alkylene terephthalate homopolymers or copolymers different than PTT homopolymers or copolymers as disclosed herein. Such blends in which the PTT homopolymers or copolymers comprise 65 to 99.9%, preferably 80 to 99%, and more preferably 85 to 95% by weight of the total weigh of all polymers comprising the polyester A blend.

Examples of alkylene terephthalate homopolymers or copolymers different than PTT homopolymers or copolymers as disclosed herein include $C_2$ and $C_4$ to $C_8$ alkylene terephthalate homopolymers or copolymers such as butylene terephthalate homopolymers or copolymers, ethylene terephthalate homopolymers or copolymers, hexamethylene terephthalate homopolymers or copolymers. Specific examples of $C_2$ and $C_4$ copolymers include, without limitation, trimethylene terephthalate-butylene terephthalate copolymers, trimethylene terephthalate-ethylene terephthalate copolymers, and mixtures thereof.

The concentration of polyester in the polyester compositions disclosed herein ranges from about 10 to 95 weight percent.

Polyalpha-1,3-Glucan Esters

Poly alpha-1,3-glucan esters disclosed herein include those defined by structure (I) below:

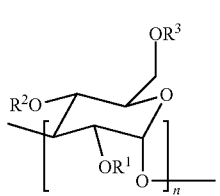

(I)

wherein n is at least 6; $R^1$, $R^2$, and $R^3$ are independently selected from H or an acyl group and wherein poly alpha-1,3-glucan ester (I) has a degree of substitution of about 0.3 to about 3.0. In other words, for every repeat unit (I) in which n is 1, of poly alpha-1,3-glucan there are 3 hydroxyl groups (—OH) which may be substituted with up to 3 acyl groups.

Acyl groups may be independently selected from the group consisting of acetyl; benzoyl;

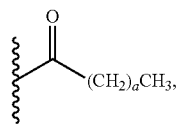

wherein a ranges from 7 to 24, preferably from 7 to 16 and more preferably from 9 to 16;

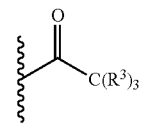

wherein $R^3$ can be independently selected from H atoms, linear alkyl groups, branched alkyl groups, cyclic alkyl groups, and aryl groups comprising from one to 24 carbon atoms;

Preferably, when $R^1$ is benzoyl, then $R^2$ or $R^3$ is acetyl or

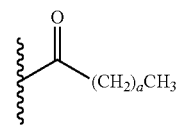

wherein a is independently 1-24.

For acyl group

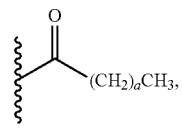

when a is 7 to 24, the acyl group can be, for example, enanthyl, caprylyl, pelargonyl, capryl, undecanoyl, lauroyl, tridecanoyl, myristyl, pentadecanoyl, palmitoyl, heptadecanoyl, stearyl, nonadecanoyl, arachidyl, uneicosanoyl, behenyl, trieicosanoyl, lignoceryl, pentaleicosanoyl, and cerotyl respectively.

For acyl group

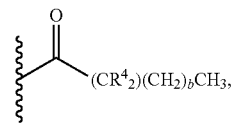

when $R^4$ is methyl and b is 0, the acyl group is 2,2-dimethylproprionyl. When $R^4$ is ethyl the acyl group is 2,2-diethylpropionyl.

In acyl group

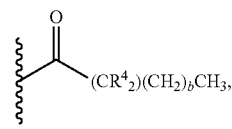

$R^4$ may be a linear C1 to C8 alkyl, a branched alkyl group, or a cyclic group. Examples of branched alkyl groups include t-butyl, s-butyl, and neo-pentyl. Examples of cyclic groups include non-aromatic and aromatic groups such a phenyl and cyclohexane groups.

It is understood that during synthesis of poly alpha-1,3-glucan esters from poly alpha-1,3-glucan that the acyl groups may react and be attached to any of the three possible hydroxyl groups in the poly alpha-1,3-glucan. For example, when poly alpha-1,3-glucan is substituted with 0.5 moles of acyl functional groups, the acyl groups are essentially randomly dispersed among the three possible hydroxyl groups to a total concentration of 0.5 moles of acyl groups.

Poly alpha-1,3-glucan esters as disclosed herein may comprise a single acyl group for R1, R2, and R3 such as an acetyl group, ethyl group, propyl group, or butyl group, or a combination of these or the poly alpha-1,3-glucan ester may comprise a combination of different acyl groups such as acetyl and lauryl groups. R1, R2, and R3 groups which do not comprise an acyl group are hydrogens unless the poly alpha-1,3-glucan ester is substituted with 3 moles of acyl groups in which case all of R1, R2, and R3 are acyl groups and no R groups are hydrogen. For any acyl group substitution on the hydroxyl groups of between 0.3 moles and less than 3 moles, R1, R2, and R3 would be a random combination of hydrogen and at least one acyl group.

Depending on the end use application, poly alpha-1,3-glucan esters as disclosed herein may comprise from about 0.05 moles of a nonaromatic acyl group substituent having from C6 to C24 carbon atoms to about 0.4 moles and from about 2 moles to 2.85 moles of an acetyl group substituent.

Poly alpha-1,3-glucan esters may comprise from about 0.05 moles of an aromatic acyl group substituent having from C6 to C24 carbon atoms to about 0.8 moles and from about 1.5 moles to 2.85 moles of an acetyl group substituent.

Poly alpha-1,3-glucan esters may also comprise acyl group substituents which only comprise various combinations of C2 to C5 carbon atoms. When acyl groups comprising only C2 to C5 carbon atoms are present as substituents in the poly alpha-1,3-glucan esters, it is preferred that at least 50 percent of the acyl groups in the poly alpha-1,3-glucan ester are acetyl groups or propionyl groups with the remaining acyl groups being selected from C4 an C5 acyl groups. A preferred poly alpha-1,3-glucan ester comprises only acetyl groups as the acyl groups. When the poly alpha-1,3-glucan ester comprises only acetyl groups, the preferred degree of substitution ranges from about 2 to 2.95, preferably from 2.5 to 2.7.

The concentration of poly alpha-1,3-glucan esters in the polyester composition may range from about 5 to 90 weight percent based on the total weight of polyester resins and poly alpha-1,3-glucan esters in the polyester composition. The preferred concentration of poly alpha-1,3-glucan esters in the polyester compositions will vary depending on the polyester resin used, the degree of acyl group substitution on the poly alpha-1,3-glucan ester, the acyl group used, and the ratio of the different acyl groups present in the poly alpha-1,3-glucan esters when more than one acyl group is present such as a combination of acetyl or lauryl acyl groups in the poly alpha-1,3-glucan ester.

Additives

The polyester compositions may also comprise additional additives such as UV stabilizers, anti-oxidants, other polymers, lubricants, plasticizers, and fillers. Suitable lubricant additives include silicone lubricants such as dimethylpolysiloxanes and their derivatives; oleic acid amides; alkyl acid amides, and bis-fatty acid amides. Other suitable additives include non-ionic surfactant lubricants; hydrocarbon waxes; chlorohydrocarbons; fluorocarbons; oxy-fatty acids; esters such as lower alcohol esters of fatty acids and metal salts of fatty acids, such as lauric acid and stearic acid. Examples of plasticizers include glycol esters such as polyethylene glycol 4 dilaurate, polyethylene glycol 400 bis(2-ethylhexanoate), methoxy polyethylene glycol 550 2-ethylhexanoate, tetraethylene glycol bis(2-ethylhexanoate), neopentyl glycol dibenzoate, and trioctyl trimellitate. Examples of antioxidants include phosphites and hindered phenol antioxidants, such as Irganox® stabilizers. Suitable thermal stabilizers include calcium carbonate, magnesium carbonate, and calcium stearate. Suitable ultraviolet light stabilizers include benzotriazoles, benzophenones, aromatic benzoates, cyano acrylates, and oxalic acid anilides.

Process to Prepare Polyester Compositions

The polyester compositions described herein may be prepared by melt-blending the components using any known methods. The component materials may be mixed to homogeneity using a melt-mixer such as a single or twin-screw extruder, blender, kneader, Banbury mixer, etc. to give a polyester composition. Or, part of the materials may be mixed in a melt-mixer, and the rest of the materials may then be added and further melt-mixed until homogeneous. When adding the components in a stepwise fashion, part of any component and any other component may be first added and melt-mixed with the remaining components and further melt-mixed until a well-mixed composition is obtained. The melt-mixing can result in pellets, which can be extruded or molded into articles.

Polyester Compositions

The concentration of polyester (A) and poly alpha-1,3-glucan ester (B) in the polyester compositions disclosed herein may be adjusted to provide for improved impact strength and heat deflection temperature properties. For example, when the polyester composition comprises:

A) from about 10 to about 75 weight percent of at least one polyester selected from the group consisting of poly(trimethylene terephthalate), polyethylene terephthalate, polybutylene terephthalate, and copolymers thereof; and B) from about 25 to about 90 weight percent of at least one poly alpha-1,3-glucan ester having a degree of substitution of from about 0.3 to 3 moles of at least two acyl groups per repeat unit of poly alpha-1,3-glucan;

wherein said at least one poly alpha-1,3-glucan ester comprises from 0.05 to 0.2 moles of at least one acyl group selected from enanthyl, caprylyl, pelargonyl, capryl, undecanoyl, lauroyl, tridecanoyl, myristyl, pentadecanoyl, palmitoyl, heptadecanoyl, stearyl, nonadecanoyl, arachidyl, uneicosanoyl, behenyl, trieicosanoyl, lignoceryl, pentaleicosanoyl, cerotyl, and from 2.7 to 2.3 moles of acetyl groups; these polyester compositions exhibit an impact strength when measured according to ASTM 256-10 which is at least 10 percent, preferably at least 20 percent, and more preferably at least 50 percent greater than polyester A.

When polyester compositions disclosed herein comprise:

A) from about 10 to about 85 weight percent of poly (trimethylene terephthalate); and B) from about 15 to about 90 weight percent of at least one poly alpha-1,3-glucan ester having a degree of substitution of from about 2.55 to 2.9 moles of at least two acyl groups per repeat unit of poly alpha-1,3-glucan;

wherein said at least one poly alpha-1,3-glucan ester comprises from 0.05 to 0.2 moles of at least one acyl group selected from enanthyl, caprylyl, pelargonyl, capryl, undecanoyl, lauroyl, tridecanoyl, myristyl, pentadecanoyl, palmitoyl, heptadecanoyl, stearyl, nonadecanoyl, arachidyl, uneicosanoyl, behenyl, trieicosanoyl, lignoceryl, pentaleicosanoyl, cerotyl, and from greater than 2.5 to 2.7 moles of acetyl groups, the polyester compositions exhibit a heat deflection temperature when measured according to ASTM D648-16 method B which is at least equal to or greater than polyester A.

The polyester compositions may also comprise a single acyl group such as acetyl, propionyl, butyryl groups, or a combination of these groups.

For example, when the polyester composition comprises a single acyl group, at least one polyester (A) is present from about 10 to 80 weight percent and is selected from the group consisting of poly(trimethylene terephthalate), polyethylene terephthalate, polybutylene terephthalate, and copolymers thereof; and poly alpha-1,3-glucan ester (B) is present from about 20 to about 90 weight percent, has a degree of substitution of from about 0.3 to 3 moles of acyl groups selected from acetyl, propionyl, butyryl groups, and combinations of these.

Articles Comprising the Polyester Compositions Described Herein

The polyester compositions described herein may be molded into articles using any suitable melt-processing technique known in the art, such as injection molding, extrusion molding, blow molding, and injection blow molding. Injection blow molding and injection molding are more preferred with injection molding most preferred. In addition, these compositions may be formed into films and sheets by extrusion to result in either cast and/or blown films. Such sheets may be further thermoformed into articles and structures that may be oriented from the melt or at a later stage in processing. These compositions may also be used to form fibers and filaments that may be oriented from the melt or at a later stage in processing. Articles comprising these compositions include, without limitation, gears, toys, household appliance parts, electronics parts, writing pen bodies, conveyor belt parts, safety restraint parts, car interior parts, automotive fasteners.

EXAMPLES

Materials

PTT: A poly(trimethylene terephthalate) polyester available as Sorona® 3000 NC010 from E.I. DuPont de Nemours and Company, Wilmington, Delaware, USA [DuPont].

PBT: A polybutylene terephthalate polyester available as Crastin® 6130 NC010 from DuPont.

PET: A polyethylene terephthalate polyester available as PET PQB 25 from PolyQuest.

GLA-1: A glucan laurate acetate in which 2.7 moles of acetate and 0.1 mole of laurate per repeat unit of glucan were grafted onto the hydroxy groups of the glucan molecule.

GLA-1 was prepared as follows:

Poly alpha-1,3-glucan powder (54.25 g) which had been vacuum dried to remove water, was added to stirring dimethylacetamide (DMAc) (550 mL) in a 1 liter reaction kettle. This suspension was heated to 100° C. for 45 minutes, cooled to 50° C., and a solution of lauroyl chloride (35 mL) in DMAc (25 mL) was added followed by a solution of acetyl chloride (100 mL) in DMAc (50 mL). The reaction was heated to 60° C. for 3 hours followed by precipitating the solution into water/methanol (50/50 v/v) using a Waring blender. The precipitated solid was filtered and re-blended with water, aqueous $NaHCO_3$ (2.5% wt. %) until pH 7, followed by water, methanol, and soaked in methanol overnight. The solid was washed with MeOH three additional times before drying in a vacuum oven. The product was isolated as a white powder (87.6 g). The degree of substitution was determined by $^1H$ NMR in $CDCl_3$.

GLA-2: A glucan laurate acetate in which 2.5 moles of acetate and 0.2 mole of laurate per repeat unit of glucan were grafted onto the hydroxy groups of the glucan molecule.

GLA-2 was prepared as follows:

Poly alpha-1,3-glucan powder (161.6 g) which had been vacuum dried to remove water, was added to stirring DMAc (900 mL) in a 2 liter reaction kettle. The suspension was heated to 100° C. for 120 minutes, cooled to 35° C., and a solution of lauroyl chloride (70 mL) in DMAc (80 mL) was added. Acetyl chloride (250 mL) in DMAc (250 mL) was added in portions over a 35-minute time period. The reaction was heated to 65° C. for 4 hours followed by precipitation of the reaction mixture into water/methanol (50/50 v/v) using a Waring blender. The solid was filtered and mixed with methanol (3 times). The solid was soaked overnight in methanol, filtered, and blended 2 additional times with methanol before drying in a vacuum oven. The product was isolated as a fine white powder (253.7 g). The degree of substitution was determined via $^1H$ NMR in $CDCl_3$.

GLA-3: A glucan laurate acetate in which 2.3 moles of acetate and 0.3 mole of laurate per repeat unit of glucan were grafted onto the hydroxy groups of the glucan molecule.

GLA-3 was prepared as follows:

Poly alpha-1,3-glucan powder (298 g) which had been vacuum dried to remove water, was added to stirring DMAc (2000 mL) in a 4 liter reaction kettle. The suspension was heated to 100° C. for 60 minutes, cooled to 27° C., and a solution of lauroyl chloride (335 mL) in DMAc (265 mL) was added followed by a solution of acetyl chloride (380 mL) in DMAc (270 mL). The reaction was heated to 65° C. for 4 hours and the resulting reaction mixture was precipitated into water/methanol (50/50 v/v) using a Waring blender. The solid was filtered and re-blended with methanol (2 times). The solid was soaked in methanol overnight, filtered, and re-blended with methanol before drying in a vacuum oven. The product was isolated as a white powder (541.2 g). The degree of substitution was determined via $^1H$ NMR in $CDCl_3$.

GDA-1: A glucan acetate in which 2.4 moles of acetate per repeat unit of glucan were grafted onto the hydroxy groups of the glucan molecule. GDA-1 was prepared as follows:

Poly alpha-1,3-glucan powder (124.92 g) which had been vacuum dried to remove water, was added to stirring DMAc (1000 mL) in a 2 liter reaction kettle. The suspension was heated to 100° C. for 40 minutes, cooled to 50° C., and a solution of acetyl chloride (200 mL) in DMAc (230 mL) was added. The reaction was heated to 60° C. for 3.5 hours and the reaction product was precipitated into water using a Waring blender. The solid was filtered and washed with aqueous $NaHCO_3$ (2.5 wt. %) until pH 7, followed by water, water/methanol (60/40 v/v), and soaked in methanol overnight. The solid was filtered and washed with methanol before drying in a vacuum oven. The product was isolated as a white powder (186 g). The degree of substitution was determined by $^1H$ NMR in TFA-d/benzene.

ECP: A ethylene vinyl acetate copolymer modified with maleic anhydride and available as Fusabond® C190 from DuPont.

Talc: Available through Specialty Minerals Inc. as TALC 9102.

Test Methods

All samples were tested dry as molded after aging at least 24 hours. Samples were tested at 23° C. and 50% relative humidity.

Tensile strength/Elongation at Peak/Young's Modulus

Tensile properties were measured per ASTM D638-14 (2014) with Type I bars using an Instru-Met 4202 load frame at a crosshead speed of 5 mm/min. The thickness and width of the gage length segment of the samples was measured with a micrometer and utilized for calculation of the tensile properties. A MTS 634.25E-54 axial extensometer was utilized for measuring strain on the samples. Averages of at least three test samples are listed in the Tables below. The tensile bars were aged for at least 24 h in a sealed bag (dry as molded) before testing.

Impact Strength

The notched IZOD impact resistance was determined per ASTM D256-10 (2010) test method A. ASTM D790 flex bars were cut to length using a shear and notched using a Tinius Olsen model 899 specimen notcher. IZOD impact testing was performed using a Ceast® Resil Impactor (type 6967.000). The average of six test specimens (generated from three samples) is reported in the tables below. The flex bars were aged for at least 24 h in a sealed bag (dry as molded) before testing.

Heat Deflection Temperature

Heat deflection temperature (HDT) values were determined according to ASTM D648-16 (2016) method B using a Dynisco Polymer Test HDV3, under a flexural stress of 264 psi (1.82 MPa). The average of two test specimens are listed in the tables below.

Sample Preparation

All test samples were molded from polyester resins and poly alpha-1,3-glucan esters which were dried in a vacuum oven at 60° C. for at least 12 hours prior to mixing and extrusion. Test samples were molded using a DSM Xplore™ model 2005 15 cm³ twin-screw micro compounder and DSM Xplore™ 10 cm³ injection molder. Test samples were melt-mixed for 2 minutes at 150 RPM before injection molding into either ASTM D790 flex or ASTM D638 Type 1 tensile bars. Samples were tested dry as molded after aging at least 24 hours in a sealed bag.

All examples except C1-C4 and E10-E12 were extruded and molded into test bars with PTT at 235° C. and a mold temperature of 50° C. E10-E12 were extruded and molded into test bars with PTT at 240° C. and a mold temperature of 50° C. C1 was extruded and molded into test bars at 260° C. and a mold temperature of 50° C., C2 was extruded and molded into test bars at 260° C. and a mold temperature of 95° C. C3 was extruded and molded into test bars at 250° C. and a mold temperature of 80° C., and C4 was extruded and molded into test bars at 285° C. and a mold temperature of 130° C. C2 and C4 were compounded with 0.5 wt. % talc to improve crystallinity and reduce mold cycle time. Test results are shown in the tables below. All concentrations are in weight percent.

Glucan laurate acetate with 0.1 moles laurate content was compounded with PTT at various concentration ratios as shown in table 1 and compared to PTT resin as the control (C1). The results in table 1 clearly show that when the glucan laurate acetate ester concentration in the polyester compositions ranges from about 20 to less than 70 weight percent the improvement in tensile strength is at least 36 percent, the improvement in heat deflection temperature is at least 100° C., and the improvement in Young's modulus is at least 45 percent compared to neat PTT resin. Impact strength is significantly improved when the concentration of poly alpha-1,3-glucan ester in the polyester composition is at least about 30 percent.

TABLE 2

|  | E7 | E8 | E9 |
|---|---|---|---|
| PTT | 50 | 10 | 50 |
| GLA-2 | 50 | 90 |  |
| GLA-3 |  |  | 50 |
| Physical Properties | | | |
| Tensile strength (MPa) | 59 | 73 | 40 |
| Elongation at peak (%) | 1.9 | 1.9 | 1.6 |
| Young's modulus (MPa) | 3636 | 4637 | 2736 |
| Impact strength (J/m) | 103 | 187 | 13 |
| Heat deflection temp. (° C.) | 126 | 127 | 96 |

Table 2 shows the physical properties of polyester compositions comprising glucan laurate acetate esters having different degrees of substitution of acyl groups than the glucan laurate acetate esters used in table 1. These results show that a small change in the concentration of certain acyl groups can change the physical properties of the polyester composition. E4 in table 1 comprises a 50/50 ratio of polyester resin to a glucan laurate acetate ester having 0.1 mole of laurate groups and 2.5 moles of acetyl groups. E7 comprises a glucan laurate acetate ester having 0.2 moles of laurate groups and 2.5 moles of acetyl groups at the same 50/50 weight ratio. E7 has lower values for all physical properties tested compared to E4. However, E7 exhibits improved tensile strength, heat deflection temperature, Young's modulus, and impact strength compared to neat PTT resin (C1). The results in table 2 also show the effect that altering the degree of substitution of acyl groups in the poly alpha-1,3-glucan ester can have on physical properties.

TABLE 1

|  | C1 | C2 | E1 | E2 | E3 | E4 | E5 | E6 |
|---|---|---|---|---|---|---|---|---|
| PTT | 100 | 100* | 90 | 80 | 70 | 50 | 30 | 10 |
| GLA-1 |  |  | 10 | 20 | 30 | 50 | 70 | 90 |
| Physical Properties | | | | | | | | |
| Tensile strength (MPa) | 52 | 67 | 59 | 71 | 80 | 70 | 43 | 43 |
| Elongation at peak (%) | 2.9 | 9.8 | 7.9 | 3.3 | 3.6 | 2.2 | 0.9 | 1.2 |
| Young's modulus (MPa) | 2325 | 3009 | 2917 | 3380 | 3407 | 4025 | 4715 | 5187 |
| Impact strength (J/m) | 50 | 37 | 33 | 45 | 210 | 239 | 290 | 406 |
| Heat deflection temp. (° C.) | 41.5 | 136.7 | 62.3 | 142.7 | 145.2 | 148.4 | 148.9 | 149.2 |

*Contains 0.5% talc

E9 uses a poly alpha-1,3-glucan ester comprising 0.3 moles of laurate groups vs. 0.2 moles of laurate groups used in E7 at the same 50/50 weight ratio. E9 exhibits improved heat deflection temperature and Young's modulus compared to neat PTT resin, but compared to E7, the physical properties are inferior.

Examples E4, E7, and E9 comprise slightly different molar concentrations of laurate groups (0.1, 0.2, and 0.3 moles respectively). As the concentration of laurate groups increases, tensile and thermal properties tend to decrease.

Table 3 shows the physical properties of polyester compositions comprising poly alpha-1,3-glucan where the acetyl groups are acetate. Compositions E10, E11, and E12 have increased tensile strength, Young's Modulus, and HDT compared to C1. When the polyester compositions contain approximately 30-50 wt. % glucan diacetate, the tensile strength increases at least 27% compared to C1, the Young's modulus is at least 43% higher than C1, the impact strength is at least 79% higher than C1, and the heat deflection temperature is at least 74% higher than C1.

TABLE 3

|  | C1 | E10 | E11 | E12 |
|---|---|---|---|---|
| PTT | 100 | 80 | 70 | 50 |
| GDA |  | 20 | 30 | 50 |
| Physical Properties | | | | |
| Tensile strength (MPa) | 52 | 66 | 78 | 71 |
| Elongation at peak (%) | 2.9 | 2.4 | 2.4 | 1.7 |
| Young's modulus (MPa) | 2325 | 3626 | 4095 | 4769 |
| Impact strength (J/m) | 50 | 24 | 243 | 364 |
| Heat deflection temp. (° C.) | 41.5 | 150 | 162 | 168 |

These results also show that specific physical properties of the polyester compositions disclosed herein can be altered by modifying not only the degree of substitution of the poly alpha-1,3-glucan ester but the acyl group used.

TABLE 4

|  | E13 | E14 |
|---|---|---|
| PTT | 50 | 10 |
| GLA-1 | 45 | 85 |
| ECP | 5 | 5 |
| Physical Properties | | |
| Tensile strength (MPa) | 74 | 52 |
| Elongation at peak (%) | 2.8 | 2.5 |
| Young's modulus (MPa) | 3739 | 4212 |
| Impact strength (J/m) | 256 | 493 |
| Heat deflection temp. (° C.) | 147.3 | 149.5 |

E13 is an example of a polyester composition comprising an ethylene copolymer additive. The addition of an ethylene copolymer significantly improves the impact strength of E13 compared to E4 (which uses the same poly alpha-1,3-glucan ester at 50 weight percent). E4 has an impact strength of 239 J/m whereas E13 has an impact strength of 256 J/m, an improvement of 7 percent. E14 is an additional example of a polyester composition comprising an ethylene copolymer additive. E14 has an impact strength of 493 J/m, an 18 percent improvement over E6 (406 J/m), which has the same PTT content.

Glucan laurate acetate esters were compounded with PBT at concentration ratios shown in table 5 and compared to neat PBT resin as the control (C3). Table 5 shows that polyester composition E16 comprising 30 wt. % poly alpha-1,3-glucan ester with 0.1 moles of laurate groups has significantly improved properties compared to PBT control sample C3. Composition E16 has 32 percent higher tensile strength, 53 percent lower elongation at peak, 26 percent higher Young's modulus, 78 percent higher impact strength, and 15 percent higher heat deflection temperature. Composition E17 contains 90 wt. % poly alpha-1,3-glucan ester with 0.1 moles of laurate groups and displays lower tensile strength and elongation at peak, but higher Young's modulus and impact strength compared to E16 and C3. Composition E15 contains 20 wt. % poly alpha-1,3-glucan ester with 0.1 moles of laurate groups and displays higher tensile strength and Young's modulus, but lower elongation at peak and impact strength than C3.

TABLE 5

|  | C3 | E15 | E16 | E17 |
|---|---|---|---|---|
| PBT | 100 | 80 | 70 | 10 |
| GLA-1 |  | 20 | 30 | 90 |
| Physical Properties | | | | |
| Tensile strength (MPa) | 56 | 72 | 82 | 32 |
| Elongation at peak (%) | 9.8 | 5.4 | 4.6 | 0.6 |
| Young's modulus (MPa) | 2686 | 3316 | 3637 | 5013 |
| Impact strength (J/m) | 58 | 42 | 267 | 371 |
| Heat deflection temp. (° C.) | 128 | 151 | 151 | 147 |

Glucan laurate acetate esters were compounded with PET at concentration ratios shown in table 6 and compared to neat PET resin as the control (C4). PET was compounded with a small loading of talc (0.5 wt. %) to help induce crystallinity so that the samples could readily be removed from the mold. The results in table 6 show that when the glucan laurate acetate ester concentration in the polyester composition is 10 percent, the elongation at peak is increased while the other properties are similar or lower relative to the PET control. When the glucan laurate acetate content is increased to 30 wt. %, the polyester composition has increased tensile strength, elongation at peak, Young's modulus, impact strength, and HDT compared to the PET base resin. When the concentration of GLA is increased to 50 wt. % loading, the tensile strength and elongation at peak decrease while the Young's modulus, impact strength, and HDT increase compared to both the 30 wt. % composition and the PET base resin. Compared with the PET control, the 30 wt. % composition has a 26 percent improvement in tensile strength, a 31 percent improvement in elongation at peak, an 11 percent improvement in Young's modulus, an 86% improvement in impact strength, and a 9 percent improvement in HDT.

TABLE 6

|  | C4 | E18 | E19 | E20 |
|---|---|---|---|---|
| PET | 100 | 90 | 70 | 50 |
| GLA-1 |  | 10 | 30 | 50 |
| Physical properties | | | | |
| Tensile strength (MPa) | 78 | 73 | 105 | 67 |
| Elongation at peak (%) | 4.7 | 19 | 6.8 | 1.6 |
| Young's modulus (MPa) | 3519 | 3169 | 3966 | 4656 |
| Impact strength (J/m) | 36 | 35 | 256 | 333 |
| Heat deflection temp. (° C.) | 123 | 84 | 135 | 149 |

The invention claimed is:

1. A polyester composition comprising:
(A) about 10 to about 95 weight percent of at least one polyester selected from the group consisting of poly(trimethylene terephthalate), polyethylene terephthalate, polybutylene terephthalate, and a copolymer thereof; and
(B) about 5 to about 90 weight percent of at least one poly alpha-1,3-glucan ester having a degree of substitution of (i) 0.05 to 0.3 with at least one acyl group selected from enanthyl, caprylyl, pelargonyl, capryl, undecanoyl, lauroyl, tridecanoyl, myristyl, pentadecanoyl, palmitoyl, heptadecanoyl, stearyl, nonadecanoyl, arachidyl, uneicosanoyl, behenyl, trieicosanoyl, lignoceryl, pentaleicosanoyl, or cerotyl, and (ii) 2.3 to 2.95 with acetyl groups.

2. An article comprising the polyester composition of claim 1.

3. The article of claim 2, in the form of an automotive interior part.

4. The polyester composition of claim 1, comprising:
about 10 to about 75 weight percent of the polyester, and about 25 to about 90 weight percent of the poly alpha-1,3-glucan ester; wherein the degree of substitution is (i) 0.05 to 0.2 with said at least one acyl group selected from enanthyl, caprylyl, pelargonyl, capryl, undecanoyl, lauroyl, tridecanoyl, myristyl, pentadecanoyl, palmitoyl, heptadecanoyl, stearyl, nonadecanoyl, arachidyl, uneicosanoyl, behenyl, trieicosanoyl, lignoceryl, pentaleicosanoyl, or cerotyl, and (ii) 2.3 to 2.7 with said acetyl groups.

5. The polyester composition of claim 4, wherein said polyester composition exhibits an impact strength when measured according to ASTM 256-10 that is at least 10 percent greater than the impact strength of the polyester.

6. The polyester composition of claim 1, comprising:
about 10 to about 85 weight percent of said poly(trimethylene terephthalate); and about 15 to about 90 weight percent of the poly alpha-1,3-glucan ester, wherein the degree of substitution is
(i) a degree of substitution of 0.05 to 0.2 with said at least one acyl group selected from enanthyl, caprylyl, pelargonyl, capryl, undecanoyl, lauroyl, tridecanoyl, myristyl, pentadecanoyl, palmitoyl, heptadecanoyl, stearyl, nonadecanoyl, arachidyl, uneicosanoyl, behenyl, trieicosanoyl, lignoceryl, pentaleicosanoyl, or cerotyl, and
(ii) 2.3 to 2.7 with said acetyl groups.

7. The polyester composition of claim 6, wherein said polyester composition exhibits a heat deflection temperature when measured according to ASTM D648-16 method B that is at least equal to or greater than the heat deflection temperature of the poly(trimethylene terephthalate).

8. The polyester composition of claim 1, comprising:
about 10 to about 80 weight percent of the polyester, and about 20 to about 90 weight percent of the poly alpha-1,3-glucan ester, wherein the degree of substitution with the acetyl groups is about 2.3 to 2.8.

9. The polyester composition of claim 8, comprising:
about 10 to about 75 weight percent of the polyester, and about 25 to about 90 weight percent of the poly alpha-1,3-glucan ester.

10. The polyester composition of claim 9, wherein said polyester composition exhibits an impact strength when measured according to ASTM 256-10 that is at least 50 percent greater than the impact strength of the polyester.

11. The article of claim 2, in the form of a consumer electronic.

12. The article of claim 2, in the form of a toy.

13. The article of claim 2, in the form of a household appliance part.

14. The article of claim 2, in the form of a film.

15. The article of claim 14, wherein the film is a cast film or a blown film.

16. The article of claim 2, in the form of an electronics part.

17. The article of claim 2, in the form of a gear.

18. The article of claim 2, in the form of a writing pen body.

19. The article of claim 2, in the form of an automotive fastener.

20. A fiber or filament comprising the polyester composition of claim 1.

* * * * *